(12) United States Patent
O'Leary

(10) Patent No.: US 9,650,267 B2
(45) Date of Patent: May 16, 2017

(54) FLUID TREATMENT REACTOR

(75) Inventor: Kevin Patrick O'Leary, Lemont, IL (US)

(73) Assignee: Nalco Company, Naperville, IL (US)

( * ) Notice: Subject to any disclaimer, the term of this patent is extended or adjusted under 35 U.S.C. 154(b) by 1156 days.

(21) Appl. No.: 12/493,848

(22) Filed: Jun. 29, 2009

(65) Prior Publication Data

US 2010/0326929 A1    Dec. 30, 2010

(51) Int. Cl.
 *C02F 1/52*   (2006.01)
 *B01D 9/00*   (2006.01)
 *C02F 9/00*   (2006.01)

(52) U.S. Cl.
 CPC .......... *C02F 1/5281* (2013.01); *B01D 9/0036* (2013.01); *C02F 1/5236* (2013.01); *C02F 9/00* (2013.01); *C02F 2301/046* (2013.01); *C02F 2305/12* (2013.01)

(58) Field of Classification Search
 CPC ......... B01D 9/0036; C02F 1/52; C02F 1/5236
 USPC .................................................. 210/712, 714
 See application file for complete search history.

(56) References Cited

U.S. PATENT DOCUMENTS

| 5,160,610 | A  | * | 11/1992 | O'Reilly ..................... 210/194 |
| 7,598,929 | B2 |   | 10/2009 | Ohnuki et al. |
| 2005/0077834 | A1 |   | 4/2005 | Ohnuki et al. |
| 2006/0196835 | A1 | * | 9/2006 | Shimamura et al. ......... 210/712 |

FOREIGN PATENT DOCUMENTS

| DE | 855239 C | 11/1952 |
| DE | 975542 C | 12/1961 |
| JP | 53103973 A | 9/1978 |
| JP | 61093893 A | 5/1995 |
| JP | 11309464 A | 11/1999 |
| JP | 2000-225395 | 8/2000 |
| JP | 2002018448 A | 1/2002 |
| JP | 2003126606 A | 5/2003 |
| JP | 2006-007010 A | 1/2006 |
| WO | WO2005077834 | * 8/2005 ............ C02F 1/52 |

* cited by examiner

*Primary Examiner* — Peter Keyworth
(74) *Attorney, Agent, or Firm* — Eric D. Babych; Brinks Gilson & Lione

(57) ABSTRACT

A fluid treatment reactor is provided. Separate input ports for influent and recycled effluent serve to eliminate the need for pH adjustment or carbonate stripping of the influent and recycled effluent flows.

11 Claims, 2 Drawing Sheets

FLUID TREATMENT REACTOR

FIELD OF THE INVENTION

The present invention relates generally to fluid treatment reactors and more specifically to precipitating and/or removing constituents using a crystallization precipitation reactor.

It is known that precipitation processes involve changing the chemical environment of a fluid, for example, a water or wastewater stream, with various chemical species to affect removal of some or all of target chemical contaminants, or species to be recovered, in the fluid. The change in chemical environment causes the soluble contaminants to become insoluble, which facilitates subsequent removal of the contaminants or product to be recovered, by clarification, filtration, or any other solid/liquid separation device. The resultant slurry can be dewatered by a mechanical device such as a filter press, belt press, centrifuge, or any other device well known to one having ordinary skill in the art. The resultant slurry could also be completely dewatered through the use of a thermal device, such as a drier.

The apparatus of the present disclosure must be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, all of the aforesaid advantages should be achieved without incurring any substantial relative disadvantage.

SUMMARY OF THE INVENTION

The disadvantages and limitations of the background art are overcome by the present invention.

There is provided a crystallization precipitation reactor including a media in the reactor. The reactor includes a vessel. The vessel includes a top portion and a bottom portion. A solid discharge port is defined in the vessel between the top and bottom portion. a media inlet port to allow for recharging or addition of 'clean' media to keep the process with sufficient media to provide effective treatment is defined in the vessel between the top and bottom portion. An effluent discharge port is defined in the vessel proximate the top portion of the vessel. An influent input port is defined in the bottom portion of the vessel. The influent input port is in fluid communication with the media. The vessel also includes a recycled effluent port defined in the bottom portion of the vessel. The recycled effluent port is also in fluid communication with the media.

There is also provided a fluid treatment system. The fluid treatment system includes a crystallization precipitation reactor. The reactor includes a media within the reactor. The reactor also includes a vessel. The vessel includes a top portion and a bottom portion. A solid discharge port is defined in the vessel between the top and bottom portion. A media inlet port is defined in the vessel An effluent discharge port is defined in the vessel proximate the top portion of the vessel. An influent input port is defined in the bottom portion of the vessel. The influent input port is in fluid communication with the media. The reactor also includes a recycled effluent port defined in the bottom portion of the vessel. The recycled effluent port is also in fluid communication with the media. The fluid treatment system includes a reagent source coupled to the vessel and in fluid communication with the media. The reagent source is selectively coupled with the recycled effluent port. The fluid treatment system also includes an optional suspended solids polishing device in fluid communication with the effluent discharge port and with the influent input port.

There is also provided a method for treating a fluid with a crystallization precipitation reactor. The reactor includes a vessel containing a media and defining a lower portion and an upper portion. The method includes injecting influent into the reactor proximate the lower portion of the vessel via a first conduit. The method also includes discharging effluent from the reactor proximate the upper portion of the vessel into an optional suspended solids polishing device. The method also includes injecting recycled effluent from the suspended solids polishing device into the reactor proximate the lower portion of the vessel via a second conduit.

The apparatus of the present disclosure is of a construction which is both durable and long lasting, and which may require little or no maintenance to be provided by the user throughout its operating lifetime. The apparatus of the present disclosure is intended to be of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENTS

There is disclosed a fluid treatment system 10. The fluid treatment system 10 utilizes a crystallization precipitation reactor 20 to precipitate and/or remove contaminants from fluids. The fluid treatment system 10 can also be used to precipitate other species from a fluid, the species then later being recovered. For purposes of this disclosure "contaminant" will be used to refer to either of these two types of substances within a fluid.

Figure 1:
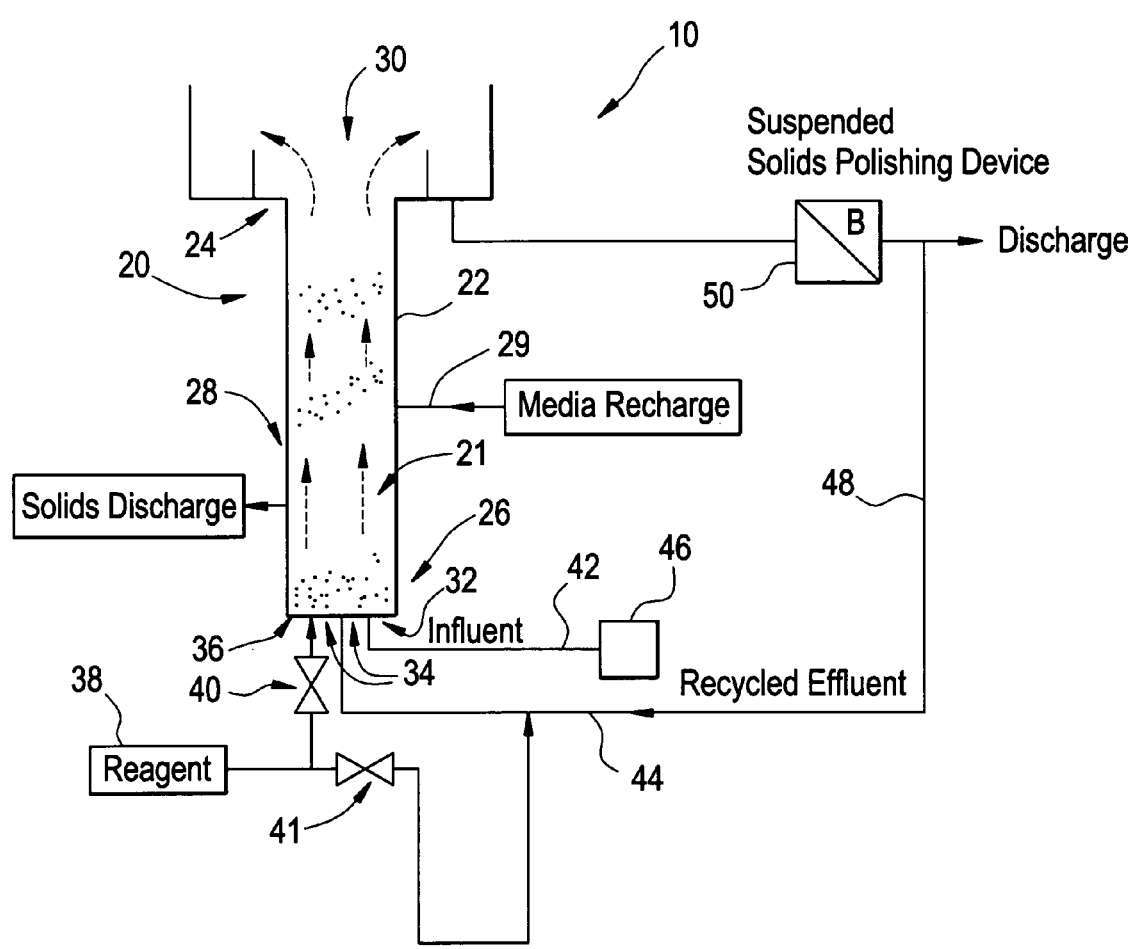
FIG. 1 is a fluid diagram of an exemplary embodiment of a fluid treatment reactor.

Referring to FIG. 1, the fluid treatment system 10 includes a crystallization precipitation reactor 20. The crystallization precipitation reactor 20 contains a media 21 within it. The media 21 could be one of sand and/or seeding agent, for example a purer/conditioned form of the constituent(s) to be precipitated. Other types of media are also envisioned. The seeding material to be utilized is any material that can be fluidized and provide a nucleation point to help produce a crystal, and/or provide for the adsorption of a precipitated material.

The crystallization precipitation reactor 20 includes a vessel 22 which contains the media 21 and includes various ports in fluid communication with the media 21 for ingress and egress of fluids or other material. The vessel 22 includes a top portion 24 and a bottom portion 26. The vessel 22 is designed for flow to enter proximate the bottom portion 26 and be forced through the media 21 and up through the vessel 22 in the direction of the top portion 24.

As is well known in the art, reagent(s) are added to alter the chemical environment of the flow of fluid passing through the media 21 and in doing so causes the soluble chemical contaminants dissolved in the fluid to become insoluble. It is occasionally necessary to discharge the solids built up within the vessel 22. Therefore, the vessel 22 contains a selectively openable solid discharge port 28 proximate the bottom portion 26 of the vessel 22 and positioned between the top portion 24 and bottom portion 26 of the reactor 20. The solid discharge port 28 serves as an exit for solids and other material built up within the vessel 22. The vessel 22 also contains a selectively operable media inlet port 29 to allow for recharging or addition of 'clean' media to keep the process with sufficient media to provide effective treatment.

Influent is supplied from an influent source 46. The influent travels through a first pipe 42 to the vessel 22. The vessel 22 defines an influent input port 32 in the bottom portion 26 of the vessel 22 which allows influent fluid to enter the vessel 22. The influent input port 32 is in fluid communication with the media 21. The influent will move or migrate upward though the vessel 22 toward the top portion 24 and exit from the vessel 22 through an effluent discharge port 30 defined in the vessel 22 near the top portion of the vessel 22. This device is intended/designed to keep the media contained within the vessel 22.

Effluent that is discharged from the vessel 22 travels to an optional suspended solids polishing device 50, where the effluent may undergo further reduction of precipitated or other suspended solids. The effluent then exits the suspended solids polishing device 50 and may either be discharged or may become recycled effluent.

Recycled effluent is routed back to the crystallization precipitation reactor 20 from the recycled effluent source 48 through a second pipe 44, not in fluid communication with the first pipe 42, to a recycled effluent port 34 defined in the bottom portion 26 of the vessel 22.

Recycled effluent is once again added to the vessel 22 to accommodate limited precipitation reaction rates of the process, to facilitate fluidization of the bed, and to provide consistent hydraulic loading to the crystallization precipitation reactor 20 to facilitate possible influent flow variations.

Because the flows of influent and recycled effluent are not in fluid communication prior to entering the vessel 22 and are instead contained separately within the first pipe 42 and second pipe 44 respectively, there is no need to treat the recycled flows with pH adjustment or carbonate stripping, as is well known in the art, to prevent the formation of amorphous precipitated solids that would dramatically reduce the advantages of the process. Therefore, the fluid treating system 10 is of simple construction, control, and operation and allows for a simple chemical injection system for fluid treatment.

A chemical reagent(s) can be added to the vessel 22 to effect precipitation within the crystallization precipitation reactor 20. Therefore, a reagent source(s) 38 is provided. The reagent flowing from the reagent(s) source 38 is provided with two alternate flow paths. The first flow path leads to a reagent nozzle 38 in fluid communication with the vessel 22. The first flow path is controlled by a selectively openable first valve 40. The second flow path is controlled by a selectively openable second valve 41. When the second valve 41 is in an open configuration, the reagent source 38 is placed in fluid communication with the second pipe 44 containing recycled effluent.

Figure 2A:
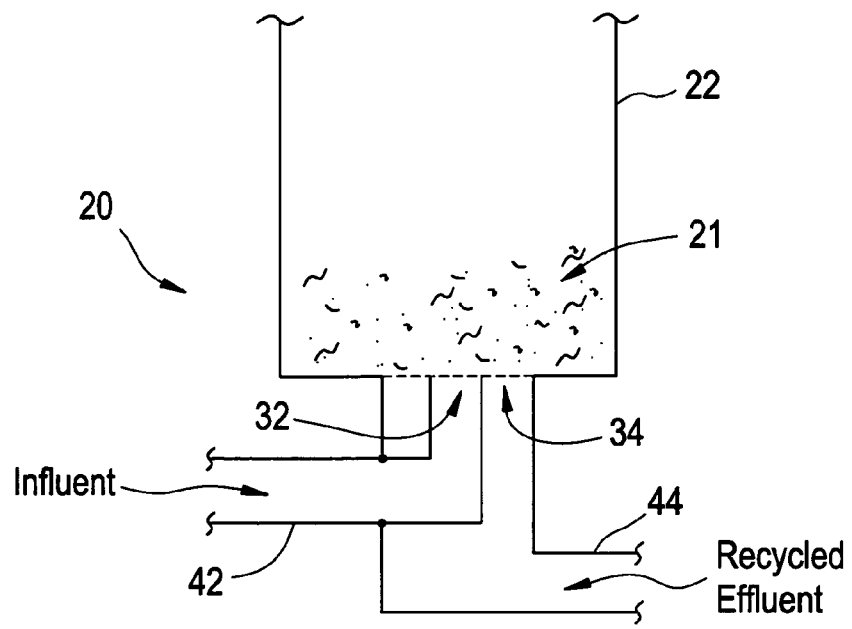
FIG. 2A is a fluid diagram of an exemplary embodiment of a fluid treatment reactor utilizing concentric input ports.

FIG. 2A illustrates an alternate configuration of the first pipe 42 and the second pipe 44. In this embodiment, the first pipe 42 conveying influent has a smaller radius than the second pipe 44 conveying recycled effluent, and is placed concentrically within the second pipe 44. Therefore, the influent and recycled effluent are not in fluid communication until the influent and recycled effluent are released into the vessel 22 at the same portion of the vessel 22, while still eliminating the need for pH adjustment or carbonate stripping of the recycled effluent.

Figure 2B:
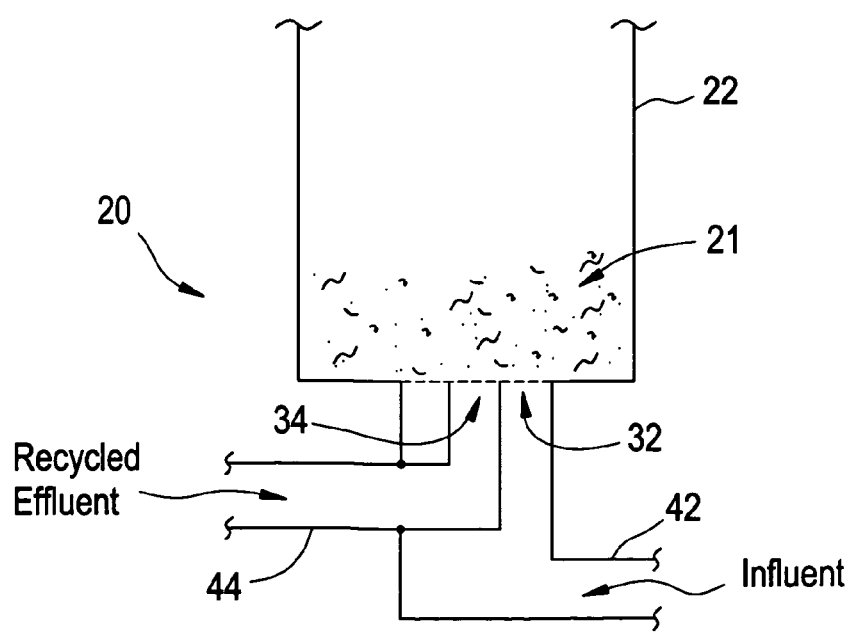
FIG. 2B is a fluid diagram of an exemplary embodiment of a second embodiment of a fluid treatment reactor utilizing concentric input ports.

FIG. 2B illustrates another alternate configuration of the first pipe 42 and the second pipe 44. In this embodiment, the second pipe 44 conveying recycled effluent has a smaller radius than the first pipe 42 conveying influent, and is placed concentrically within the first pipe 42. Therefore, again the influent and recycled effluent are not in fluid communication, however, the influent and recycled effluent are released into the vessel 22 at the same portion of the vessel 22, while again eliminating the need for pH adjustment or carbonate stripping of the recycled effluent.

It should be understood that appropriate pumps, valves, sensors, and controllers are coupled to the vessel 22 and associated piping or plumbing and configured to operate the fluid treatment system 10.

The vessel 22, ports 28, 29, 30, 32, 34, and pipes 42, 44 may be composed of metal, plastic, composite materials, and combinations thereof, as determined by an operator or manufacturer as appropriate based on the type of fluid to be treated and various other considerations.

For purposes of this disclosure "fluid", "influent", and "recycled effluent" being treated by the fluid treatment reactor include water, wastewater, slurries, suspensions, colloids, solutions, and other fluids including liquids and other non-water or water-based fluids. This list is not exhaustive, but given only as an example of possible fluids, influents, and recycled effluents which the fluid treatment reactor of the present invention is arranged and configured to treat. Other fluids, influents, and recycled effluents are also envisioned.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

The fluid treatment reactor is of a construction which is both durable and long lasting, and it should also require little or no maintenance to be provided by the user throughout its operating lifetime. The fluid treatment reactor is also of relatively inexpensive construction to enhance its market appeal and to thereby afford it the broadest possible market. Finally, the fluid treatment reactor achieves all of the aforesaid advantages and objectives without incurring any substantial relative disadvantage.

Although the foregoing description of the fluid treatment reactor and method has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the continuous flow bypass manifold and method. The particular embodiments and applications were chosen and described to provide the best illustration of the principles of the fluid treatment reactor and its practical application to thereby enable one of ordinary skill in the art to utilize the fluid treatment reactor in various embodiments and with various modifications as are suited to the particular use contemplated. All such changes, modifications, variations, and alterations should therefore be seen as being within the scope of the fluid treatment reactor and method as determined by the appended claims when interpreted in accordance with the breadth to which they are fairly, legally, and equitably entitled.

What is claimed is:

1. A method for treating a fluid, the method comprising:
injecting influent into a crystallization precipitation reactor, wherein the crystallization precipitation reactor comprises a vessel containing a media and defining a lower portion and an upper portion,
the influent injected into the reactor proximate the lower portion of the vessel via a first conduit, the flow of influent in an upward direction relative to the reactor;
discharging effluent from the reactor proximate the upper portion of the vessel into a suspended solids polishing device; and
injecting recycled effluent from the suspended solids polishing device into the reactor proximate the lower portion of the vessel via a second conduit, the flow of recycled effluent in an upward direction relative to the reactor,
wherein one of the first and second conduits injects fluid into the reactor through the bottom of the reactor at a position substantially located at the center of the bottom of the reactor, and
wherein the first conduit and second conduit are concentric relative to each other and define concentric and parallel flows,
wherein the first conduit and second conduit are in fluid communication with the vessel, and the influent within the first and second conduits do not contact each other until they have made contact with the media in the vessel,
and wherein the concentric flows do not contact the media in the vessel until they exit the respective first and second conduits,
and wherein the flow from the first and second conduits maintains consistent hydraulic loading of the reactor.

2. The method according to claim 1, further comprising the step of injecting reagent into the reactor proximate the lower portion of the vessel, or into the second conduit.

3. The method according to claim 1, further comprising the step of discharging solids from the vessel via a solids discharge port located in the vessel between the upper portion and the lower portion.

4. The method according to claim 1, further comprising the step of recharging or adding clean media to maintain the treatment process.

5. The method according to claim 1, wherein the fluid is water-based.

6. The method according to claim 1, wherein the media is one of sand and a seeding agent.

7. The method according to claim 6, wherein the seeding agent is a material that can be fluidized and provide a nucleation point to form a crystal and/or provide for the adsorption of a precipitated material.

8. The method according to claim 1, wherein a circumference of the upper portion is substantially the same as a circumference of the lower portion.

9. A method for treating a fluid, the method comprising:
injecting influent into a crystallization precipitation reactor, wherein the crystallization precipitation reactor comprises a vessel containing a media and defining a lower portion and an upper portion,
the influent injected into the reactor proximate the lower portion of the vessel via a first conduit, the flow of influent in an upward direction relative to the reactor;
discharging effluent from the reactor proximate the upper portion of the vessel into a suspended solids polishing device; and
injecting recycled effluent from the suspended solids polishing device into the reactor proximate the lower portion of the vessel via a second conduit, the flow of recycled effluent in an upward direction relative to the reactor,
wherein one of the first and second conduits injects fluid into the reactor through the bottom of the reactor, and
wherein the first conduit and second conduit are concentric relative to each other and define concentric and parallel flows,
wherein the first conduit and second conduit are in fluid communication with the vessel, and the influent within the first and second conduits do not contact each other until they have made contact with the media in the vessel,
and wherein the concentric flows do not contact the media until they exit the respective first and second conduits.

10. The method of claim 9, wherein the radius of the first conduit at the reactor is smaller than the radius of the second conduit at the reactor, and the first conduit is disposed concentrically within the second conduit.

11. The method of claim 9, wherein the radius of the second conduit at the reactor is smaller than the radius of the first conduit at the reactor, and the second conduit is disposed concentrically within the first conduit.

* * * * *